July 18, 1933.  S. B. ALCOTT  1,918,680
MANURE SPREADER
Filed March 31, 1931   2 Sheets-Sheet 2
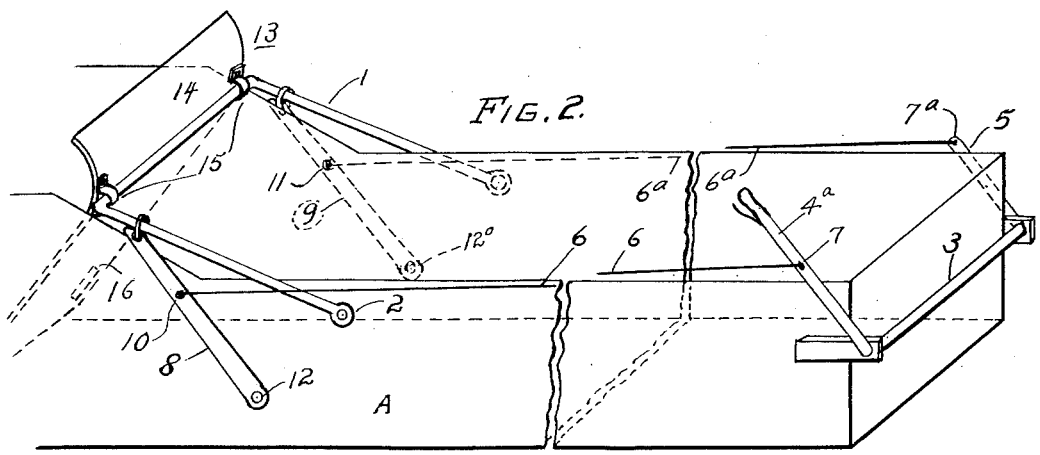
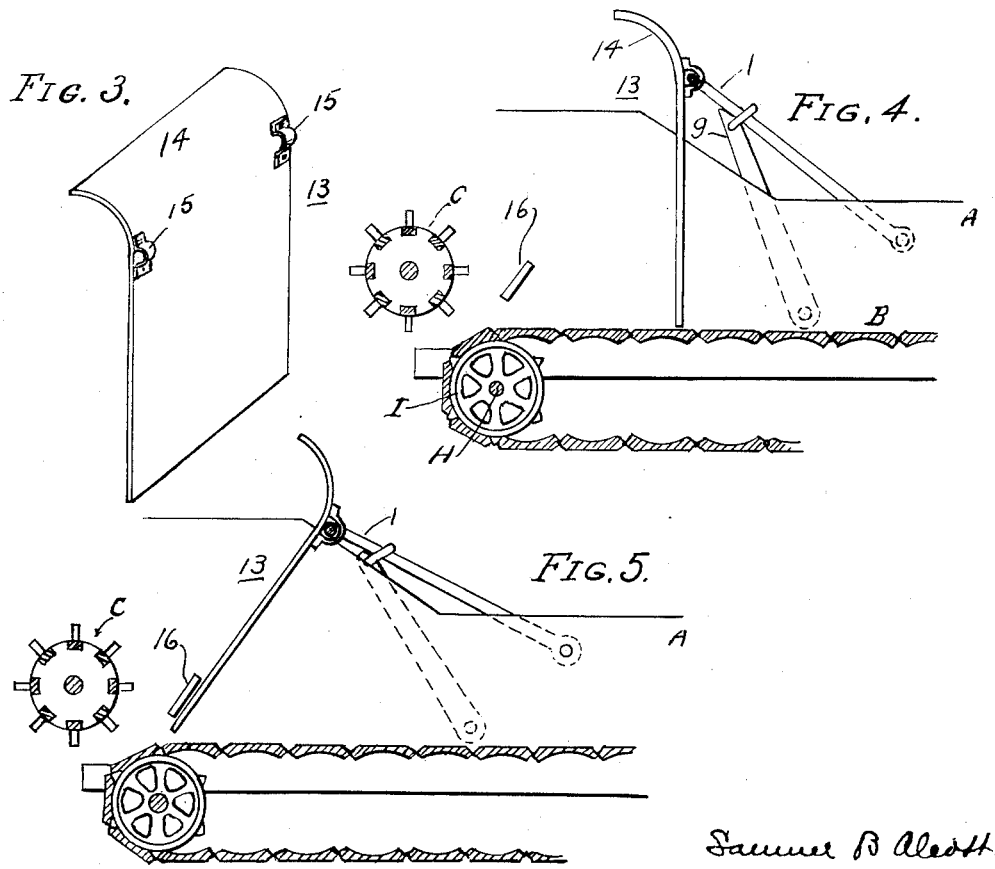
Samuel B Alcott
INVENTOR.

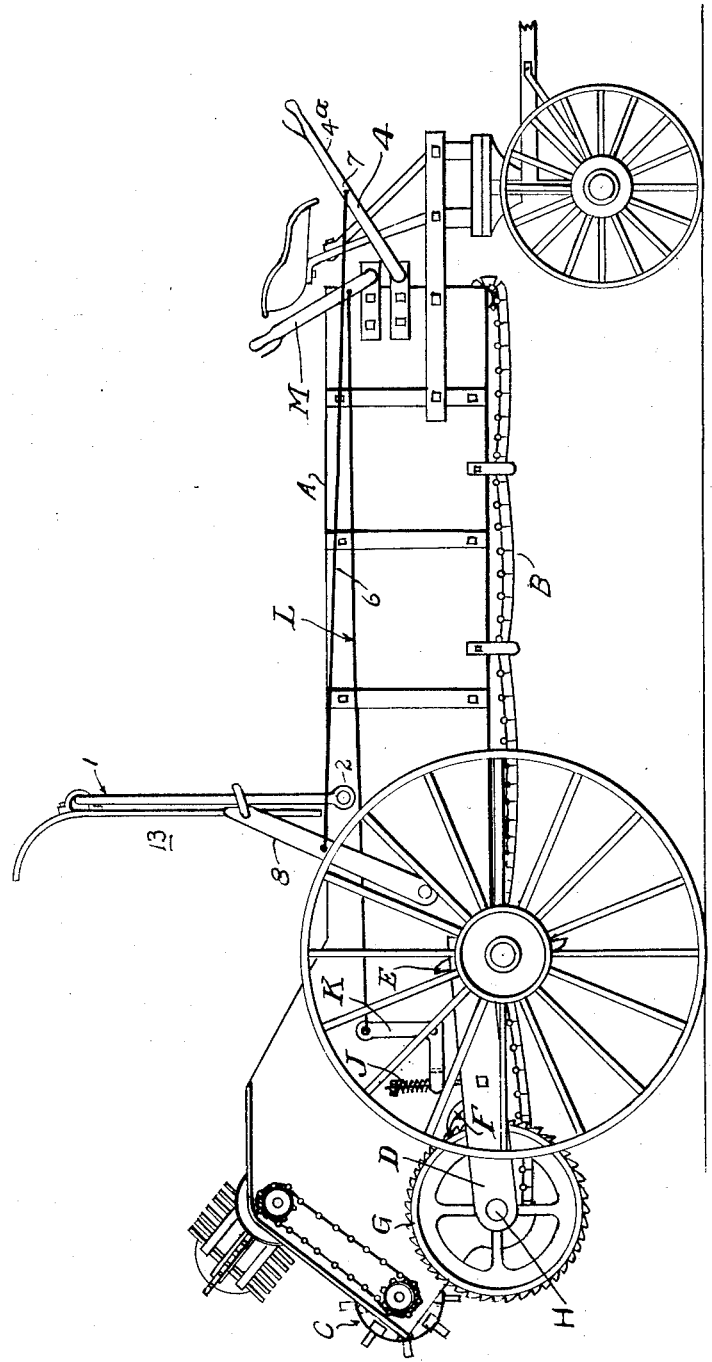

Patented July 18, 1933

1,918,680

UNITED STATES PATENT OFFICE

SAMUEL B. ALCOTT, OF URSINA, PENNSYLVANIA

MANURE SPREADER

Application filed March 31, 1931. Serial No. 526,709.

My invention relates to an attachment for that type of farm machinery generally known as manure spreaders, and more specifically to a combination end-gate, barrier, and follower board.

In the return apron or conveyor type of spreader where the apron is only approximately the length of the bed and a front end-gate or follower board is secured to and travels with the apron or conveyor the load is pushed positively to the beaters. However with the endless conveyor type of spreader no front end-gate can be used to act as a follower board to provide a forced feed and as a consequence the apron slips under the load near the end of the unloading operation and the beaters also throw manure back into the bed, making the unloading taper off in volume and very irregular. This is known as trailing. It necessitates considerable of otherwise unnecessary driving in the field to completely unload. My invention entirely elminiates this disadvantage or defect.

The general object of my invention is to provide an attachment for the endless conveyor type of spreader which will prevent bunching at the start due to the load being piled onto the beater, or slipping against it while going to the field; prevent the forward throwing of manure over toward the driver's seat; and that will act as a follower board to prevent trailing of the manure by forcing it against the beaters during the operation of the same.

More particularly, my invention provides an end-gate that may be manipulated separately from the means for manipulating the control for the moving bottom, or conveyor mechanism. It provides a barrier that prevents forward throwing of manure over toward the driver's seat while unloading. And owing to the novel construction and control separate from that of the movable bottom it acts as a follower board to force the last of the load positively and effectually against the beaters and prevents the beaters throwing a portion of the manure back into the bed, delaying the unloading and causing what is known as trailing.

My invention in the form herein chosen for the purpose of disclosing the same is in the nature of a generally rectangular board or gate hingedly suspended or supported substantially transversely of the bed of the spreader from a bail member pivoted to either side of said bed, and which bail is adapted to be swung rearwardly, or manipulated from a position on or adjacent the driver's seat from a generally vertical position of said bail back to an inclined position with the board resting on the moving bottom, which bottom will carry the board, and the last portion of the load of manure with it forcing said last portion against the beaters. The board and particularly the lower part thereof, is carried back until the board as a whole makes an acute angle forwardly with the moving bottom, at which time the bail strikes the edges of the bed and the board rests against a pair of stops positioned on the inner sides of the bed and has swung free of the moving bottom permitting the same to pass freely thereunder.

The invention further resides in the general arrangement of lever mechanism and angle at which the combination follower board device lies with respect to the movable bottom, or conveyor whereby the same will be easily pulled out leaving the load to feed down to the beaters.

The invention consists in these and other features which will become apparent as the description proceeds and which are pointed out in the claims.

In the drawings Figure 1 is a side elevation of a preferred form of the invention as applied to a conventional manure spreader showing the end-gate device in the raised position. Figure 2 is a fragmentary perspective view showing the general arrangement of the lever mechanism. Figure 3 is a perspective view of the combination end-gate and barrier board. Figure 4 is a fragmentary sectional view showing the end-gate device lowered and resting on the moving bottom, and Figure 5 is a view similar to Figure 4 but showing the end-gate device carried back by the moving bottom or conveyor against the stops on the sides.

Referring to the drawing A represents the box or bed of a conventional manure spreader to which my invention may be attached. B represents the movable bottom or conveyor and C the transverse rotary beater.

A conventional arrangement for transmitting motion from a rear wheel to the moving bottom B may consist, as indicated generally in the drawing of a well known mechanism consisting in cam and ratchet mechanism designated generally by D, E, F, and G in Fig. 1, shaft H and sprocket wheel I in Fig. 4 around which bottom B is located. The means indicated generally in Fig. 1 by J, K, L, and M serves to afford manual control of the transmission of motion from the wheel to the bottom B. The means J resiliently connected to bell-crank lever K is pivotally connected to member D of the ratchet organization so that D may be moved upwardly out of driving relation with the wheel all as will be readily understood by those skilled in the art.

The moving bottom B is formed of slats or strips of suitable material hingedly connected together side by side in spaced relation to form a flexible belt presenting an irregular bottom that will engage with the lower edge of the end gate described later.

Reference numeral 1 designates a generally U shaped bail pivoted at the ends of the legs at 2 to the box or bed A. The bail can be swung from the lowered position to the raised position from the driver's seat through hand lever mechanism of which 3 is a transverse bar pivoted to the bed, and 4 and 5 are functionally integral arms of the lever from which rods 6 and 6a lead back from pivots 7 and 7a on said levers 4 and 5 respectively to a pair of auxiliary levers 8 and 9. The rods 6 and 6a are pivoted to these auxiliary levers at 10 and 11 respectively. The auxiliary levers are pivoted to the sides of the bed at 12 and 12ª and are loosely coupled to the U shaped bail by means of ring members which will permit a sliding movement of the ends of the auxiliary levers along the legs of the U shaped bail. Arm 4 may be extended to provide means 4ª to manipulate the apparatus.

The combination end-gate and follower and barrier board is represented generally by the reference numeral 13. It consists of a generally rectangular board, preferably having a curved upper portion 14, the purpose of which will be hereinafter explained. The board is pivoted as at 15 to the bail in a manner to permit pivotal movement.

16 represents strips secured on the inside of the side walls of the bed or box which form stops for the end-gate structure. The distance from the bottom edge of the end-gate structure and the point of pivotal support for the gate on the bail is such that when the moving bottom has carried the gate back toward the rotary beater C and the bail is down resting on the top edges of the sides of the bed or box as shown in Figures 2 and 5 the gate will be back contacting the strips 16 while the moving bottom B passes freely thereunder.

The operation of the device is as follows: The combination end-gate is lowered to the position shown in Figure 4. The moving bottom carries the end-gate device back to the position against the stops 16—16, as shown in Figures 2 and 5. The manure is loaded into the spreader and the end-gate prevents the load from bunching or slipping, functioning as a regular end-gate. When the field is reached in which it is desired to spread the manure the driver manipulates the hand lever 7 to raise or pull the end-gate device 13 out of the load after which it rests upon the load in a generally horizontal position with the upper curved portion or end projecting in a generally upward direction to intercept forwardly thrown manure. Owing to the angle at which the end-gate lies as shown in Figure 4, making it approximately tangent to the circumference of the circle, or portion thereof described by the pivoted bail member, it pulls out easily leaving the load to feed back to the beaters. Also the particular auxiliary lever arrangement shown aids in the ease with which the end-gate device is actuated.

While pulled out of the load the end-gate device obviously assumes a generally horizontal position resting upon the load. This is the position in which the upper curved portion acts as a barrier. The bail may be held while the device is in this effective barrier position by convenional rack and pawl mechanism associated with the handle 7. In this position the device prevents manure thrown in a forward direction from passing on toward the driver's position or seat. In this position it serves as a barrier.

As substantially the last of the load passes along with the moving bottom to the beaters the end-gate device lowers or is lowered to the position as in Figure 4 when upon contacting the irregular or slotted moving bottom it forms a geared or driven relation therewith forcing the remaining manure back to the beaters and finally assume the position shown in Figure 5, thereby acting as a follower board and preventing trailing.

Having described my invention in a preferred imbodiment or one well adapted for explaining the principle of operation I claim:

1. In a manure spreader having an endless conveyor bottom, means for transmitting motion to said conveyor bottom and manual control means therefor; a combination end-gate and follower device comprising an inverted substantially U-shaped bail, the depending ends forming legs which are pivoted to the sides of the bed, a generally rectangular board device pivoted intermediate the legs of the bail, means including the conveyor bottom to drive the lower end of said device rearwardly, means on the bed to arrest rearward travel of said board device in which arrested position said device may act as an endgate, separate and independent manual control means to actuate said bail from the end-gate position to an elevated position.

2. The apparatus as set forth in claim 1 in which the means on the bed are stops on the sides thereof arranged so that the end-gate device rests at an angle of approximately 45 degrees to the conveyor bottom.

3. The device as specified in claim 1 in which the upper end of said board device is curved out of the plain of the main portion thereof from a line adjacent to and parallel to the pivotal attachment to the bail whereby when said device is in the elevated position and resting upon the top of the load the curved portion will project in a general upward direction to intercept manure thrown forwardly of the spreader.

4. In a manure spreader having a bed and an endless conveyor bottom, a follower device, a bail to which said device is loosely coupled having a leg pivoted to each side of the bed, means to lower the bail and device so that the lower edge of the device will contact and make a driving connection with said bottom, whereby said device will function as a positively driven follower board.

5. In a manure spreader having a bed and an endless conveyor bottom, a follower device, a bail to which said device is loosely coupled having a leg pivoted to each side of the bed, means to lower the bail and the device so that the lower edge of the device will contact and make a driving connection with said bottom, whereby said device will function as a positively driven follower board, follower board stop means comprising the upper edge of said bed and means secured to the inside of the bed to limit the downward and rearward movement of said device.

6. In a manure spreader having a bed, an end-gate and compound lever means for raising said end-gate comprising a first lever in the form of an inverted substantially U-shaped bail pivoted at the ends to the bed and carrying the end-gate, remote from the pivots, a second lever having pivotal connection to the bed and a sliding engagement with said first lever from a point adjacent the end-gate to a point adjacent the pivot of said first lever and means to actuate said second lever from said first point to said second point whereby the most effective effort may be exerted at the beginning of the end-gate raising operation.

7. In a manure spreader having a bed, an end-gate and compound lever means for raising said end-gate comprising a first lever in the form of an inverted substantially U-shaped bail pivoted at an end to the bed and carrying the end-gate, a second lever having pivotal connection to the bed and an automatically shifting engagement with the first lever from a point adjacent the pivot of said bail with the end-gate to a point adjacent the pivot of said bail with the bed and means to actuate the second lever whereby the greatest effort effective to move the end-gate is at the beginning of the raising operation.

8. In a manure spreader having a bed, an end-gate device, a compound lever means for raising said device comprising a first lever, said first lever carrying said device at one end thereof and pivoted to the other end of the bed, a second lever having pivotal connection to the bed and in engagement with the first lever at a point adjacent the device when said device is in lowered or end-gate position, means for manipulating said second lever to shift said engagement of said second lever with said first lever whereby said device is easily raised.

SAMUEL B. ALCOTT.